United States Patent
Andelic (10) Patent No.: US 10,922,827 B2
(45) Date of Patent: Feb. 16, 2021

(54) DISTANCE ESTIMATION OF VEHICLE HEADLIGHTS

(71) Applicant: Aptiv Technologies Limited, St. Michael (BB)

(72) Inventor: Edin Andelic, Hagen (DE)

(73) Assignee: Aptiv Technologies Limited, St. Michael (BB)

( * ) Notice: Subject to any disclaimer, the term of this patent is extended or adjusted under 35 U.S.C. 154(b) by 85 days.

(21) Appl. No.: 16/366,084

(22) Filed: Mar. 27, 2019

(65) Prior Publication Data

US 2019/0318490 A1 Oct. 17, 2019

(30) Foreign Application Priority Data

Apr. 12, 2018 (EP) ..................................... 18166934

(51) Int. Cl.
| | | |
|---|---|---|
| *G06K 9/00* | (2006.01) | |
| *G06T 7/50* | (2017.01) | |
| *G06T 7/11* | (2017.01) | |
| *G06T 7/73* | (2017.01) | |
| *G06K 9/62* | (2006.01) | |
| *B60Q 1/14* | (2006.01) | |

(52) U.S. Cl.
CPC ............ *G06T 7/50* (2017.01); *G06K 9/00825* (2013.01); *G06K 9/6228* (2013.01); *G06K 9/6257* (2013.01); *G06K 9/6267* (2013.01); *G06T 7/11* (2017.01); *G06T 7/73* (2017.01); *B60Q 1/14* (2013.01); *G06T 2207/10016* (2013.01); *G06T 2207/20081* (2013.01); *G06T 2207/20084* (2013.01); *G06T 2207/30252* (2013.01)

(58) Field of Classification Search
CPC ........... G06K 9/00825; G06K 9/00805; G06K 9/6228; G06K 9/6257; G06K 9/6267; G06K 9/00791; G08G 1/167; G06T 2207/30256; G06T 7/50; G06T 7/11; G06T 7/73; G06T 2207/10016; G06T 2207/20081; G06T 2207/20084; G06T 2207/30252; B60R 11/04; B60Q 1/14; B60Q 1/143; B60Q 2300/42
USPC ......... 382/100, 104, 103; 340/937; 348/149, 348/148, 366; 315/82; 701/49; 362/466, 362/276
See application file for complete search history.

(56) References Cited

U.S. PATENT DOCUMENTS

| | | | |
|---|---|---|---|
| 8,199,198 B2 * | 6/2012 | Sun .................... | G06K 9/2054 348/148 |
| 8,605,154 B2 * | 12/2013 | Datta .................... | B60Q 1/143 348/148 |
| 2008/0030374 A1 | 2/2008 | Kumon et al. | |

OTHER PUBLICATIONS

Alcantarilla P F et al: "Automatic LightBeam Controller for driver assistance", Mar. 27, 2011, pp. 819-835.

* cited by examiner

*Primary Examiner* — Charlotte M Baker
(74) *Attorney, Agent, or Firm* — Colby Nipper PLLC (57) ABSTRACT

A method for determining the distance to a vehicle for use in an AHC-System includes capturing a raw image by using a camera of an AHC-System at nighttime; determining by the AHC-System that the raw image includes a headlight of a vehicle; extracting by the AHC-System an image segment of the raw image including the headlight of a vehicle; refining the image segment by applying a classifier, such as to generate a refined image including the headlight of a vehicle; building a feature vector based on the refined image; and estimating the distance to the vehicle based on the feature vector. The present invention also relates to an (Continued)

image processing system adapted to perform the above method.

20 Claims, 4 Drawing Sheets

DISTANCE ESTIMATION OF VEHICLE HEADLIGHTS

TECHNICAL FIELD OF INVENTION

This disclosure generally relates a method for determining the distance to a vehicle for use in an Automatic High-beam Control System (AHC-System) and to a corresponding image processing system comprising an AHC-System and adapted to determine the distance to a vehicle.

BACKGROUND OF INVENTION

An AHC-System is a widely used tool in state of the art Advanced Driving Assistance Systems (ADAS). It enables the driver to use the full illuminating power of his headlights whenever other traffic participants are not disturbed by the high-beam. Using a front camera (monocular or stereo), an AHC-System detects headlights of other vehicles, tracks them and classifies the tracked detections as being vehicle lights or not. Based on this classification, the high beams are controlled (shut down, switched on, deflected or dimmed).

In ADAS systems, distance estimation of the tracked headlights is typically not performed with an AHC-System using a monocular camera. Distances are rather obtained using a radar system. The drawback of using radar is twofold: First, the radar-based distances must be associated with the AHC-tracks which can be challenging and error-prone, second, distance estimation based on the radar system is limited to a range of up to 150 m. However, in a typical traffic scenario at night time, a conventional front camera can detect illuminated headlights at much greater distances (e.g. 800 m).

In view of this, alternative solutions, such as for example geometric analysis based approaches, approaches wherein the monocular image is mapped into 2D real worlds image, and AHC-system distance estimation based on camera image processing have been proposed.

For example, the document: "Robust Vehicle Detection and Distance Estimation Under Challenging Lighting Conditions" by M. Rezaei et al., IEEE Trans. On Intelligent Transportation Systems, 2015, proposes a real-time monocular-vision based techniques for simultaneous vehicle detection and inter-vehicle distance estimation. The assumption is made that at a far distance, vehicles appear to have similar features and appearances in common, including occlusion edges between vehicle and road background, different light reflectance patterns on the rear wind-shield compared to the body of a vehicle, suggesting a tendency towards a rectangular shape of the vehicle. Based on this assumption, vehicle detection is proposed based on a data fusion approach using edge and corner features in conjunction with an adaptive global Haar classification algorithm. Then, after the vehicle-detection phase, a monocular distance estimation is performed based on a hybrid method combining options inherent to a bird's eye view with pose-based trigonometry.

The document: "Robust real-time traffic light detection and distance estimation using a single camera" by M. Diaz et al., Expert Systems with Applications, 2015, proposes a traffic light detection based on analyzing color properties. To enhance the colors in video sequences, the acquisition is adapted according to the luminosity of the pixels on the top of the image. Filters based on the traffic light aspect ratios as well as the tracking stage are used to decide whether the spots on the video frames are likely to be traffic lights. Then, the distance between traffic lights and the autonomous vehicle is estimated by applying Bayesian filters to the traffic lights represented on the frames.

Unfortunately, in practice, these approaches are not very robust and can easily result in misclassifications, for example due to light reflections from the street or other light sources.

SUMMARY OF THE INVENTION

In view of the foregoing, it is an object of the present invention to improve the vehicle distance estimation in AHC-Systems, in particular to improve the robustness and precision of the distance estimation. It is a further object of the present invention to increase the range of the vehicle distance estimation, for example up to 800 m clearly exceeding the 150 m range of distance estimation provided by conventional vehicle implemented radar based systems.

In accordance with a first aspect of the present invention, a method of determining the distance to a vehicle for use in an AHC-System comprises: capturing a raw image by using a camera of an AHC-System, preferably at nighttime; determining by the AHC-System that the raw image includes a headlight or other feature of a vehicle, preferably a single headlight of a vehicle; extracting by the AHC-System an image segment of the raw image including the headlight of a vehicle; refining the image segment by applying a classifier, such as to generate a refined image including the headlight of a vehicle; building a feature vector based on the refined image; and estimating the distance to the vehicle based on the feature vector.

In other words, an AHC-System captures a raw image at nighttime and determines that the raw image includes a headlight of a vehicle. In this process, or as a result, the AHC-System extracts an image segment of the raw image, wherein the image segment is extracted to include the headlight of a vehicle.

Rather than estimating the distance to the headlight by analyzing properties of the extracted image segment, such as for example by directly analyzing the size or pixel intensities of the image segment, the present invention defines that the image segment is first refined.

More specifically, the image segment is refined by applying a classifier, such as to generate a refined image including the headlight of a vehicle. Hence, an additional image processing step is performed to have the classifier refine the image segment provided by the AHC-System, for example to provide improved or simplified image information which allows enhancing the efficiency and robustness of determining the distance to the vehicle headlight.

For this purpose, the classifier generates a refined image based on the image segment provided by the AHC-System. Then, the refined image is used for building a feature vector, and the feature vector is used for estimating the distance to the vehicle.

Thus, the classifier can be adapted to process the image segment such as to generate a refined image that is more suitable for distance estimation, for example by extracting or enhancing image information that is particularly relevant for the distance estimation, or by rejecting image information, such as for example light reflections or pixel patterns which are likely to complicate or deteriorate the results of a subsequent distance estimation.

The classifier used for generating the refined image can represent a trained classifier, such as for example a classifier that has been trained based on a machine learning algorithm.

Preferably, the classifier comprises a neural network, for example a convolutional neural network, deep-learning network, a multi-layer perceptron network, a radial basis function network and/or a general regression neural network.

The classifier can use Fuzzy-logic in the classification scheme, for example in a Neuro-Fuzzy approach.

Preferably, the method of determining the distance to a vehicle for use in an AHC-System includes a training step, wherein the classifier is trained to refine the image segment with the aim of generating a refined image that is more suitable for performing the distance estimation.

For example, the classifier can be trained based on a training data set such as to teach the classifier to extract an image excerpt, or other information from the image segment, that may be useful for simplifying or improving the distance estimation.

Preferably, the classifier can be trained to further isolate the headlight of a vehicle in the image segment, and thus to provide a refined image representing an image excerpt taken from the image segment and including the headlight.

Preferably, the classifier can be trained to extract a set of pixels from the image segment that are related to the headlight. For example, the extracted set of pixels can represent a box of pixels or a differently shaped set of pixels taken from the image segment.

In this way, the classifier can provide a refined image that is better correlated with the distance to the headlight. For example, the refined image can define a detection box that provides an improved representation of the headlight, for example by defining a smaller box encompassing the headlight but excluding undesired light reflections or light effects that can complicate or deteriorate the subsequent distance estimation. It follows that the refined image is determined by the classifier such as to provide image information that is more closely correlated with the distance to the headlight than the overall image information provided by the image segment as delivered by the AHC-System.

For example, the refined image provided by the classifier can correspond to an image excerpt of the image segment, wherein the image excerpt defines boundaries enclosing or outlining the headlight of a vehicle.

In an example, the classifier can generate an image box extracted from the image segment delivered by the AHC-System, wherein a larger size of the image box indicates a closer distance to the detected headlight, and vice-versa, assuming approximately equal headlight sizes.

The pixels in the refined image can provide further information that is useful for the distance estimation. For example, the average pixel intensity and the statistical deviation of pixel intensities from their mean value can be correlated with the distance to the headlight.

Moreover, the position of the refined image relative to the image segment or relative to the raw image can indicate the distance to the headlight, in particular where the camera is positioned and directed such that the detected vehicle headlight has a height difference to the camera, relative to the point of view of the camera. For example where the AHC-System camera is mounted behind the rear-view mirror of a vehicle carrying the AHC-System.

In view of the improved information provided by the refined image, the method according to the present invention includes building a feature vector based on the refined image, and then estimating the distance to the vehicle based on the feature vector.

For example, the feature vector can be built based on the refined image, wherein the feature vector includes the box size or dimensions defined by the refined image, for example by determining the number of pixels or the pixel area provided by the refined image. Preferably, the feature vector comprises the average pixel intensities in the revised image, the standard deviation of the pixel intensities, and the position of the box, e.g. relative to the image segment or raw image. In any case, the feature vector provides parameters allowing a robust and precise estimation of the distance to the vehicle headlight.

In an example, the feature vector does not contain the refine image or an image excerpt of the refine image. In other words, the feature vector can contain only characteristics of the image segment, rather than the image itself, or rather than an excerpt of the image itself, such as to reduce, for simplification, the amount of information used in the subsequent distance estimation based on the feature vector.

In order to estimate the distance to the vehicle headlight based on the feature vector, the feature vector can be analyzed by using a distance estimator. For example, the distance estimator can be trained by using training data, wherein the distance estimator is adapted to estimate the distance to the vehicle based on the feature vector.

In an example, the distance estimator is trained based on a machine learning algorithm, preferably a neural network training algorithm, for example wherein the distance estimator receives as an input the feature vector, such as to provide as an output a discrete or continuous value corresponding to the estimated distance to the vehicle.

Preferably, the training data includes ground truth data defining the relation between different feature vectors and different distances to a vehicle. For example, the training data can include data sets comprising known distances to the vehicle such as to define the relation between feature vectors and distances to the vehicle, wherein the distances to the vehicle are preferably in the range 5 m to 600 m, 50 m to 400 m, or 200 m to 300 m.

More specifically, the distance estimator can represent a mathematical function relating the feature vector, as an input, to the estimated distance to the vehicle headlight, as an output. For example, the mathematical function can correspond to a regression model, preferably a multivariate linear model, with coefficients adapted to have the mathematical function map the feature vector to a corresponding distance estimation.

Preferably, the mathematical function used for determining the distance estimation has a simple structure, and a low number of model coefficients, such as to: improve the generational properties of the function, to lower the computational efforts, and to simplify the training of the mathematical function based on the training data, for example by reducing the size of the set of training data used for determining the coefficients of the mathematical model. For example, the regression model can be trained using only a small portion of ground truth data, which is particularly advantageous because collecting ground truth data beyond the radar-range can be very time-consuming and difficult.

These properties are supported by the present invention, in particular because the refined image represents a compact and well-defined information container which is closely correlated with the distance to the headlight. In other words, the refined image represents a compact and well-defined information container which is more closely correlated with the distance to the headlight than the overall information of the image segment provided by the AHC-System.

Accordingly, the method according to the present invention provides a robust, efficient and precise method for estimating the distance to a vehicle. The method is based on refining an image segment provided by an AHC-System camera, wherein the image segment contains a headlight of the vehicle, and then estimating the distance to the headlight based on a feature vector, wherein the feature vector has been built based on the refined image.

It follows that the range of the distance estimation can be extended, in particular when compared to conventional approaches using monocular cameras and/or radar equipment for distance estimation.

Moreover, as the classifier is adapted to refine the image segment provided by the AHC-System, in particular to provide information relevant for the subsequent distance estimation step, the classifier does not need to be trained to estimate the distance based on the image segment. Hence, the classifier can be trained even without knowing the ground truth distances, which simplifies the training of the classifier and improves the performance of classification.

Further, as the classifier provides a refined image that is particularly suitable for distance estimation, the subsequent step of estimating the distance based on a feature vector, which has been built based on the refined image, can been simplified, further improving the robustness, efficiency and precision of the distance estimation approach.

For this purpose, it is preferred that the feature vector provides parameters allowing a robust and precise estimation of the distance to the vehicle headlight. For example, the feature vector can be built to comprise the average pixel intensities in the revised image, the standard deviation of the pixel intensities, or the position of the above image box extracted from the image segment, e.g. relative to the image segment or raw image. In this respect, the position (e.g. the X-Y-position) of the box can provide an indicator for estimating the distance to the vehicle, in particular when the position of the box reflects the perspective distance projection of the vehicle as seen from the point of view of the camera.

In an example, when the classifier performing the refining of the image segment corresponds to a first neural network, and the distance estimator corresponds to a second neural network, the number of neurons in the first neural network can be larger than the number of neurons in the second neural network, preferably at least 2, 5 or 10 times larger.

Preferably, the method for determining the distance to a vehicle for use in an AHC-System according to the present invention comprises: triggering the step of refining the image segment by applying a classifier if the AHC-System determines that the image segment includes a headlight of a vehicle.

In this way, the distance estimation is efficiently triggered by the AHC-System, such as to avoid unnecessary image processing. For example, only if the AHC-System identifies a detected light spot in the raw image as a vehicle headlight, the classifier is triggered to refine an image segment provided by the AHC-System, for example to resize and reposition an image box encompassing the headlight. Then, the refined image is processed to build a feature vector whose entries are as much correlated with the distance as possible, such as to improve or simplify the subsequent distance estimation based on the feature vector.

In any case, according to the present invention, the raw image is preferably captured by the AHC-System by using a monocular camera, preferably a video camera, further preferred a front camera of a vehicle. However, a stereo camera can also be used.

In an example, the method according to the present invention is performed online. More specifically, the method according to the present invention can be performed in real-time by repeating the method of determining the distance to a vehicle for different raw images, respectively. For example, the different raw images can be captured by the same camera but at different points in time, and the method of determining the distance to a vehicle can be performed for each of the captured raw images. Preferably, each of the raw images is captured as a frame in a video stream, and the distance estimation is performed for each of the different frames of the video stream, for example to assist the driver of a vehicle during driving at nighttime.

In any case, the estimated distance to a vehicle can be used in an AHC-System to provide improved high-beam control of a vehicle headlight. For example, the high-beam can be shut down, switched off, deflected or dimmed, if the estimated distance to an oncoming vehicle indicates that such measures will prevent other traffic participants from being disturbed by the high-beam. Alternatively, or in addition to the estimated distance to the oncoming vehicle, the information provided in the feature vector can be used for enhancing the efficiency and reliability of the high-beam control. For example, the high-beam can be deflected, or at least partly dimmed or turned on or off, based on the detected position of the oncoming headlight in the raw image or image segment, as indicated by the feature vector. Particularly, if the position of the box extracted from the image segment is indicated in the feature vector to be on the left-hand side, then the high beam can be switched off on the left-hand side but can remain switched on on the right-hand side. Also, if the average pixel intensity within the box—as e.g. indicated in the feature vector—exceeds a threshold value, then the high beam can be switched off completely (as the high intensity could indicate that the oncoming vehicle uses its own high beam to signal that the high-beam might be inappropriate).

According to a second aspect of the present invention, an image processing system is adapted to perform the above method according to the present invention. For this purpose, the second aspect of the present invention defines an image processing system, comprising: an AHC-System adapted to: capture a raw image by using a camera at nighttime; determine that the raw image includes a headlight of a vehicle; and extract an image segment of the raw image including the headlight of a vehicle; the image processing system further comprising an image processing means adapted to: refine the image segment by applying a classifier, such as to generate a refined image including the headlight of a vehicle; build a feature vector based on the refined image; and estimate the distance to the vehicle based on the feature vector.

The above described advantages and benefits of applying the method for determining the distance to a vehicle in accordance with the present invention also apply for the above image processing system, in particular when used in an automobile.

Further features and advantages will appear more clearly on a reading of the following detailed description of the preferred embodiment, which is given by way of non-limiting example only and with reference to the accompanying drawings.

BRIEF DESCRIPTION OF DRAWINGS

Further embodiments of the invention are described in the following description of the Figures. The invention will be explained in the following by means of embodiments and with reference to the drawings in which is shown.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In the following, any statements made having regard to the direction of a component are made relative to the position shown in the drawing and can naturally vary in the actual position of application.

Figure 1:
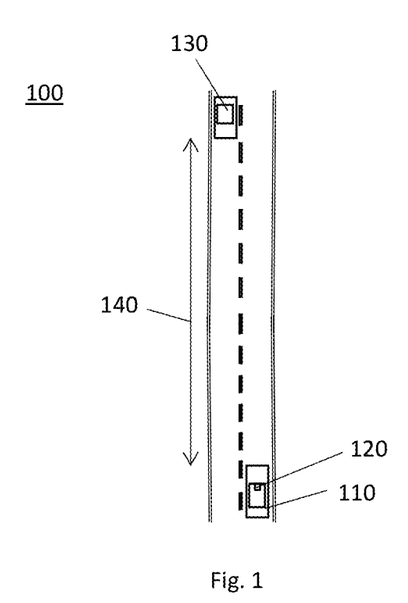
FIG. 1 illustrates an application of an automatic high-beam control system.

FIG. 1 shows the application of an AHC-System in a road traffic scenario 100. A vehicle 110 equipped with an AHC-System including a camera 120 is shown to travel along a straight road. The AHC-System enables the driver of the vehicle 110 to use the full illuminating power of his headlights whenever other traffic participants 130 are not disturbed by the high-beam.

In particular, when the AHC-System detects headlights of a vehicle 130 belonging to the oncoming traffic, the system tracks the headlights and classifies the tracked detections as corresponding to vehicle lights or not. Based on this classification, the high beams of the vehicle 110 carrying the AHC-System are controlled (shut down, switched on, deflected or dimmed).

Moreover, the estimated distance 140 to the oncoming vehicle 130 can be used to further improve the usability of the AHC-System. For example, if the oncoming traffic 130 is detected at a very large distance, it may be sufficient to deflect or dim the headlight to avoid inconveniences for the other traffic participants. However, when the oncoming vehicle 130 is detected at a close range, the highlights can be switched off for improved safety reasons.

In a typical traffic scenario at night time, a conventional front camera can detect illuminated headlights at much greater distances (e.g. 800 m).

Figure 2:
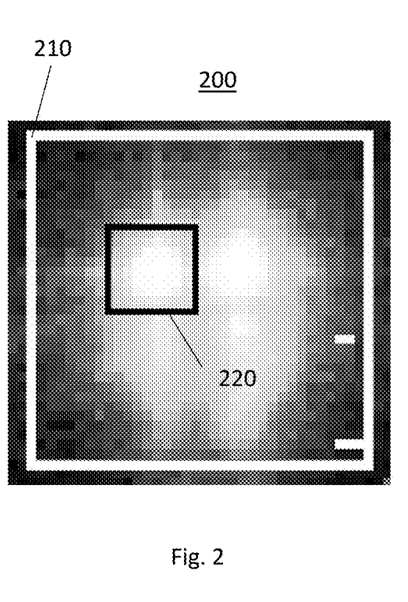
FIG. 2 illustrates a raw image of a vehicle headlight.

FIG. 2 shows a corresponding raw image 200 captured by the AHC-System camera, wherein a white box illustrating an image segment 210 has been drawn around a pixel cloud resembling a light source.

However, taking a closer look at the pixel cloud reveals that both headlights of the vehicle have been detected as a single pixel cloud. Thus, the white box 210 drawn by the AHC-System overestimates the size of a single headlight boundary, and as a result, the distance estimation will be overestimated.

In view of this problem, the present invention proposes to refine the image segment, representing the above pixel cloud provided by the AHC-System, such as to improve or simplify the image information prior to estimating the distance. For example, in FIG. 2, the black box illustrating a refined image 220 represents a refined image corresponding to the region of the image segment showing one of the headlights of the vehicle. Thus, the refined image provides information that can enhance the robustness and precision of the subsequent distance estimation.

Figure 3:
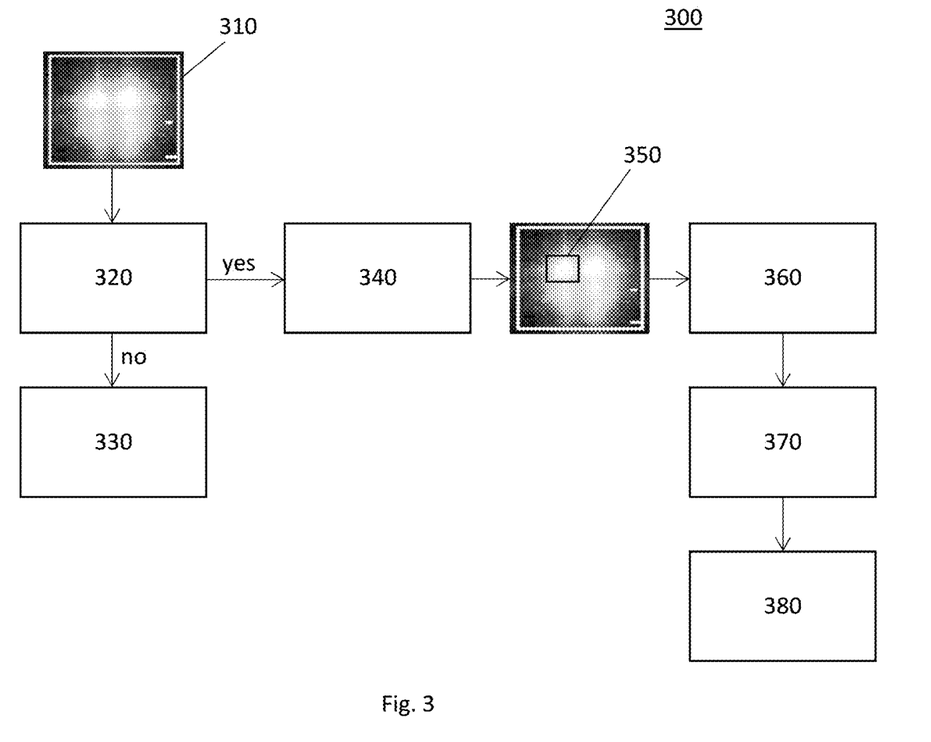
FIG. 3 illustrates a method for estimating distance to a vehicle.

More specifically, FIG. 3 shows a corresponding example of a method for estimating the distance to a vehicle 300 in accordance with the present invention.

Here, the raw image 310 as captured by the AHC-System camera is used by the AHC-System in step 320 to determine if a light spot in the raw image 310 corresponds to a vehicle headlight. If the AHC-System does not identify any such headlight in the image, the distance estimation is terminated in step 330.

However, if the AHC-System determines that the raw image 310 includes a headlight, it extracts an image segment from the raw image, wherein the image segment includes the detected headlight of a vehicle.

Then, the extracted image segment is processed by a classifier in step 340 such as to further refine the image segment for improved subsequent distance estimation. In this example, the classifier can represent a trained classifier, such as for example a classifier that has been trained based on a machine learning algorithm.

In other words, rather than estimating the distance to the headlight by analyzing properties of the extracted image segment, the present invention defines that the image segment is first refined by a classifier to provide improved or simplified image information which allows enhancing the efficiency and robustness of determining the distance to the vehicle headlight.

For example, the classifier can refine the image segment by extracting or enhancing image information that is particularly relevant for the distance estimation, or by rejecting image information, such as for example light reflections or pixel patterns which are likely to complicate or deteriorate the results of the subsequent distance estimation.

In the example shown in FIG. 3, the classifier has been trained to further isolate the headlight of a vehicle in the image segment, and thus to provide a refined image 350 representing in a black box an image excerpt taken from the image segment, wherein the black box 350 includes the headlight.

Thus, the classifier extracts a set of pixels from the image segment that is particularly relevant for determining the distance to the headlight. In the example shown in FIG. 3, the extracted set of pixels represents the black box of pixels 350 taken from the image segment.

It follows that the refined image defines a black box 350 encompassing the headlight but excluding undesired light reflections or light effects that can complicate or deteriorate the subsequent distance estimation. Thus, the refined image is determined by the classifier such as to provide image information that is closely correlated with the distance to the headlight.

The black box of pixels 350 is used in step 360 for building a feature vector such as to allow estimating the distance to the vehicle based on the feature vector.

In this example, the feature vector is built to include the black box 350 size defined by the refined image, for example by determining the dimensions or number of pixels provided by the refined image. Alternatively, the feature vector can be built based on the average pixel intensities in the black box 350, the standard deviation of the pixel intensities, or the position of the black box 350 relative to the image segment or raw image. In any case, the feature vector provides parameters allowing a robust and precise estimation of the distance to the vehicle headlight.

In order to estimate the distance to the vehicle headlight, the feature vector is analyzed in step 370 by using a distance estimator. In this example, the distance estimator correspond to a regression model with coefficients which have been adapted to have the regression model map the feature vector to provide a corresponding distance estimation 380. In other words, the distance estimator represents a regression model which has been trained by using training data, wherein the distance estimator is adapted to estimate the distance to the vehicle based on the feature vector.

Here, the regression model used for determining the distance estimation has a simple structure, and a low number of model coefficients, such as to: improve the generational properties of the distance estimator, to lower the computational efforts, and to simplify the training of the regression model, for example by reducing the size of the set of training data used for determining the coefficients of the regression.

In this way, the regression model can be trained using only a small portion of ground truth data, which is particularly advantageous because collecting ground truth data beyond the radar-range can be very time-consuming and difficult.

Accordingly, a robust, efficient and precise method for estimating the distance to a vehicle is provided. The method is based on refining an image segment provided by an AHC-System camera, wherein the image segment contains a headlight of the vehicle, and then estimating the distance to the headlight based on a feature vector, wherein the feature vector has been built based on the refined image.

It follows that the range of the distance estimation can be extended, in particular when compared to conventional approaches using monocular cameras and/or radar equipment for distance estimation.

Moreover, as the classifier is adapted to refine the image segment provided by the AHC-System, the classifier does not need to be trained to estimate the distance based on the image segment. Hence, the classifier can be trained even without knowing the ground truth distances, which simplifies the training of the classifier and improves the performance of classification.

In the example shown in FIG. 3, the method for estimating the distance to a vehicle is performed online. Thus, the raw image 310 is captured as a frame in a video stream, and the distance estimation is performed for different frames of the video stream, for example to assist the driver of a vehicle during driving at nighttime.

Figure 4:
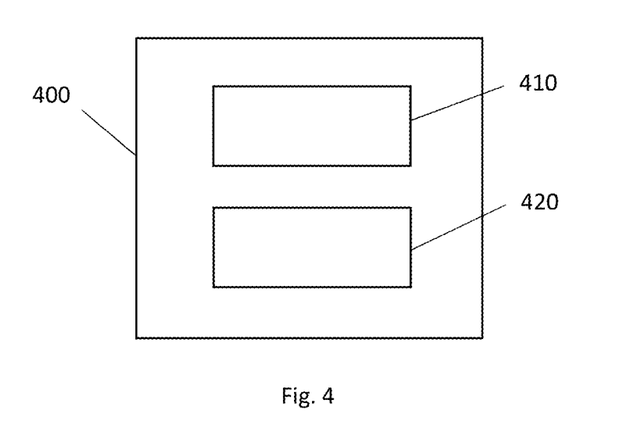
FIG. 4 illustrates an image processing system for estimating the distance to a vehicle.

FIG. 4 shows a corresponding image processing system 400 which has been adapted to perform the above method of estimating the distance to a vehicle.

More specifically, the image processing system 400 shown in FIG. 4 comprises an AHC-System 410 and an image processing means 420.

The AHC-System 410 is adapted to: capture a raw image by using a camera at nighttime; determine that the raw image includes a headlight of a vehicle; and extract an image segment of the raw image including the headlight of a vehicle.

The image processing means 420 is adapted to: refine the image segment by applying a classifier, such as to generate a refined image including the headlight of a vehicle; build a feature vector based on the refined image; and estimate the distance to the vehicle based on the feature vector.

For this purpose, the AHC-System and image processing means can share computing resources, for example, be implemented by using shared computational means, for example by sharing the computational power of a digital signal processor coupled to storage means. Here, the storage means can store instructions to be executed by the digital signal processor such as to perform, at least in part, the method steps shown in FIG. 3.

While this invention has been described in terms of the preferred embodiments thereof, it is not intended to be so limited, but rather only to the extent set forth in the claims that follow.

I claim:

1. A method for determining the distance to a vehicle for use in an AHC-System, comprising:
   capturing a raw image by using a camera of an AHC-System;
   determining by the AHC-System that the raw image includes a headlight of a vehicle; and
   extracting by the AHC-System an image segment of the raw image including the headlight of a vehicle;
   refining the image segment by applying a classifier to generate a refined image including the headlight of a vehicle;
   building a feature vector based on the refined image, the feature vector not containing the refined image or an image excerpt of the refined image; and
   estimating the distance to the vehicle based on the feature vector.

2. The method of claim 1, further comprising training the classifier based on a machine learning algorithm to further isolate the headlight of a vehicle.

3. The method of claim 2, wherein the classifier is a neural network, preferably a deep-learning network, a multi-layer perceptron network, a radial basis function network or a general regression neural network.

4. The method of any of claim 1, further comprising determining a distance estimator by using training data, wherein the distance estimator is adapted to estimate the distance to the vehicle based on the feature vector.

5. The method of claim 4, wherein the training data includes ground truth data defining the relation between different feature vectors and different distances to a vehicle, wherein the distances to the vehicle are in the range 10 m to 400 m.

6. The method of claim 4, wherein the training data includes ground truth data defining the relation between different feature vectors and different distances to a vehicle, wherein the distances to the vehicle are in the range 50 m to 200 m.

7. The method of claim 4, wherein the training data includes ground truth data defining the relation between different feature vectors and different distances to a vehicle, wherein the distances to the vehicle are in the range 100 m to 150 m.

8. The method of claim 4, wherein the distance estimator is based on a regression model.

9. The method of claim 4, wherein the distance estimator is based on a neural network, and wherein the distance estimator provides a discrete or continuous value corresponding to the estimated distance to the vehicle.

10. The method of claim 9, wherein the classifier corresponds to a first neural network, and the distance estimator corresponds to a second neural network, and wherein the number of neurons in the first neural network is at least 2 times larger than the number of neurons in the second neural network.

11. The method of claim 9, wherein the classifier corresponds to a first neural network, and the distance estimator corresponds to a second neural network, and wherein the number of neurons in the first neural network is at least IO times larger than the number of neurons in the second neural network.

12. The method of any of claim 1, wherein the refined image corresponds to an image excerpt of the image segment.

13. The method of any of claim 1, further comprising triggering the step of refining the image segment by applying a classifier if the AHC-System determines that the image segment includes a headlight of a vehicle.

14. The method of any of claim 1, wherein building a feature vector based on the refined image comprises determining: the number of pixels or the pixel area defined by the refined image, the average pixel intensity in the refined image, or the standard deviation of pixel intensities in the refined image.

15. The method of any of claim 1, wherein building a feature vector based on the refined image comprises determining: the position of the refined image relative to the image segment or relative to the raw image.

16. The method of any of claim 1, wherein the raw image is captured by the AHC-System by using a monocular camera of a vehicle.

17. An image processing system, comprising:
an AHC-System adapted to:
capture a raw image by using a camera;
determine that the raw image includes a headlight of a vehicle; and
extract an image segment of the raw image including the headlight of a vehicle; and
an image processing means adapted to:
refine the image segment by applying a classifier to generate a refined image including the headlight of a vehicle;
build a feature vector based on the refined image, the feature vector not containing the refined image or an image excerpt of the refined image; and
estimate the distance to the vehicle based on the feature vector.

18. A non-transitory computer-readable storage medium comprising instructions that, when executed, configure a processor of an AHC-System to:
capture a raw image by using a camera;
determine that the raw image includes a headlight of a vehicle; and
extract an image segment of the raw image including the headlight of a vehicle;
refine the image segment by applying a classifier to generate a refined image including the headlight of a vehicle;
build a feature vector based on the refined image, the feature vector not containing the refined image or an image excerpt of the refined image; and
estimate the distance to the vehicle based on the feature vector.

19. The computer-readable storage medium of claim 18, wherein the instructions, when executed, further configure the processor to capture the raw image using a monocular camera of a vehicle.

20. The computer-readable storage medium of claim 18, wherein the instructions, when executed, further configure the processor to build the feature vector based on the refined image by determining the position of the refined image relative to the image segment or relative to the raw image.

* * * * *